UNITED STATES PATENT OFFICE.

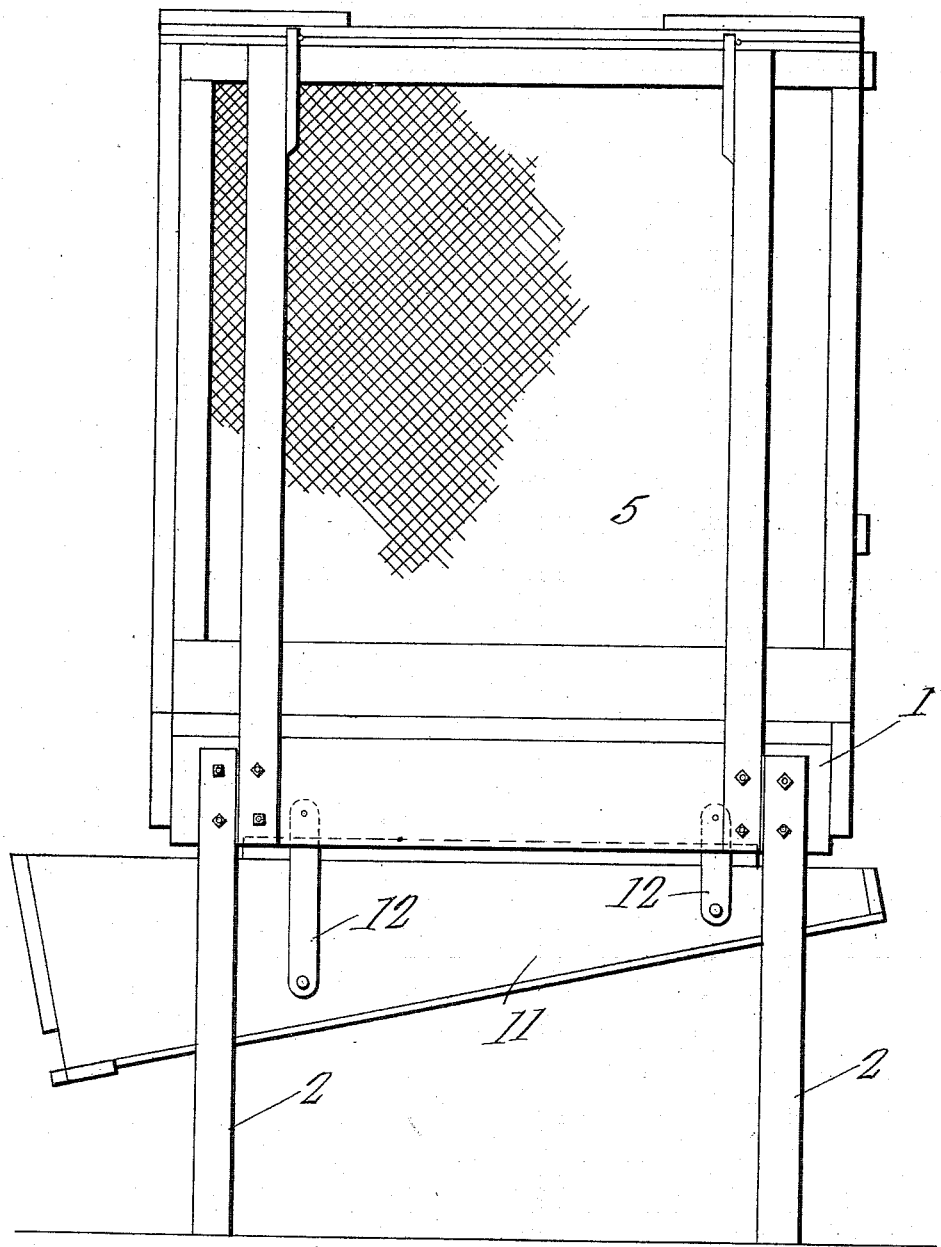

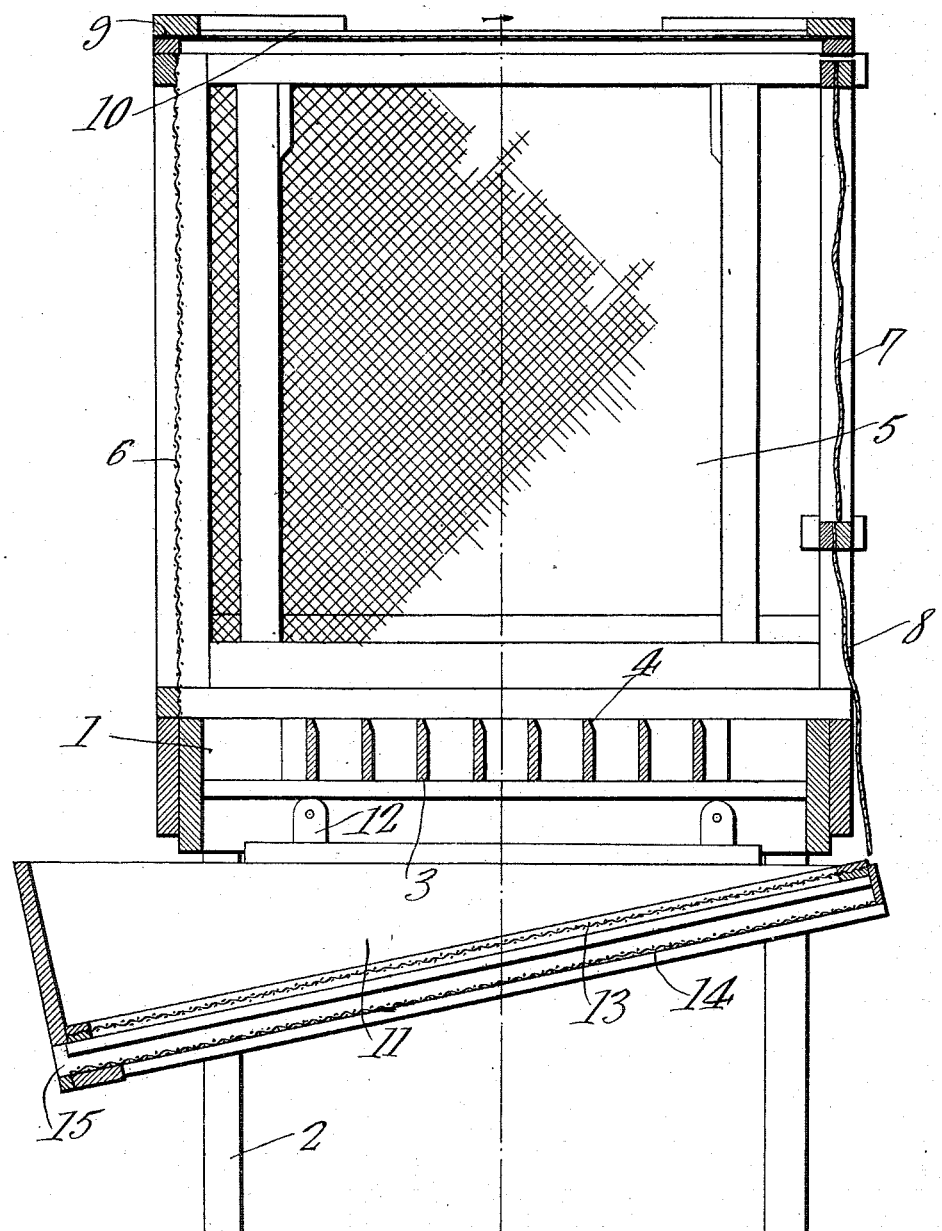

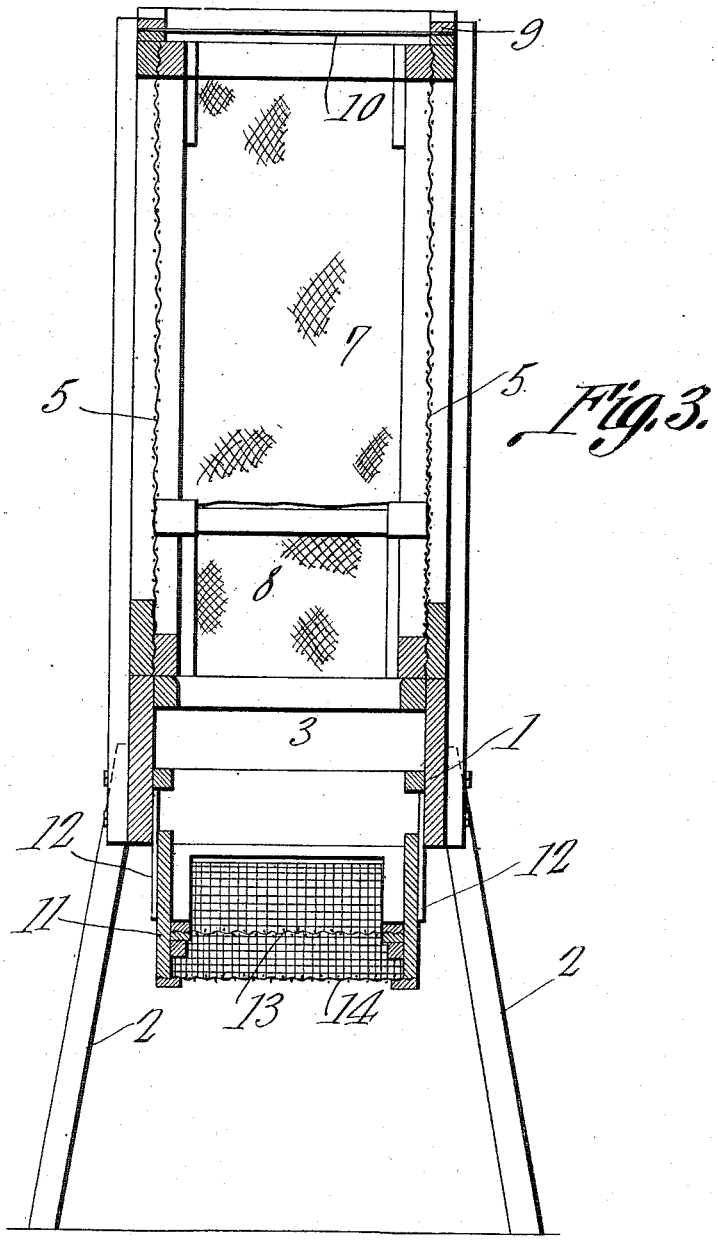

ALFRED W. POOLE, OF OZARK, ARKANSAS.

PEANUT-WHIPPER.

995,176. Specification of Letters Patent. Patented June 13, 1911.

Application filed December 15, 1910. Serial No. 597,527.

*To all whom it may concern:*

Be it known that I, ALFRED W. POOLE, a citizen of the United States, residing at Ozark, in the county of Franklin and State of Arkansas, have invented a new and useful Peanut-Whipper, of which the following is a specification.

This invention has relation to peanut whippers and it consists in the novel construction and arrangement of its parts as hereinafter described and claimed.

The object of the invention is to provide an apparatus which may be used to easily and readily remove peanuts from the root or vines of the plant and at the same time that the nuts are being removed they are screened and cleaned.

In the accompanying drawings,—Figure 1 is a side elevation of a peanut whipper. Fig. 2 is a longitudinal sectional view of the same. Fig. 3 is a transverse sectional view of the same.

The peanut whipper consists of a frame 1 which is mounted at the upper ends of supporting legs 2. The frame 1 is provided with a series of transversely disposed whipping bars 3 which are in parallel relation to each other and spaced apart. The bars 3 are slightly beveled at their upper edge portions as at 4 and it is against the said beveled portions of the bars that the nuts are whipped from the vines and roots. Side screens 5 are located at the sides of the frame 1 and an end screen 6 is located at one end of the said frame. The space between the frames of the side screens 5 are closed by curtains 7 and 8. A frame 9 is located upon the upper edges of the frames of the side and end screens and is closed by a fabric 10. A trough 11 is located under the frame 1 and is connected with the said frame by means of pivoted hangers 12. The trough 11 is provided in its bottom with spaced screens 13 and 14, the said screens being in inclined position and the lower end of the trough 11 is provided with an outlet opening 15 located between the said screens 13 and 14.

In operation the vines having the nuts adhering thereto are grasped in the hand and the operator sticks his arm into the space between the side screens 5 and the end screen 6 by lifting one or the other of the curtains 7 or 8. The vines thus inserted into the whipper are beat against the upper edges of the bars 4 and thus the nuts are knocked from the vines and also knocked from the roots. As many or as few of the nuts may be removed from the vines and roots as desired. The nuts thus removed from the vines fall through the spaces between the bars 4 upon the screens 13 and 14 in the trough 11. By reason of the fact that the space above the frame 1 is inclosed by the screens 5, 6 and top fabric 10, together with the curtains 7 and 8 there is no danger of the nuts flying away from the vines when they are being whipped from the same as all of the nuts are retained in the inclosed space and must pass down through the openings between the bars 4. When a sufficient quantity of nuts have been accumulated in the trough 11, they are removed from the same, by swinging the trough 11, so that it strikes against the frame 1 and is thereby subjected to sudden stops and jarring. All nuts and trash of the same size and smaller will pass through the screen 13 and the nuts and trash of the same size will fall upon the screen 14. The smaller trash passes through the screen 14. All large particles of trash will remain upon the screen 13 and will work toward the lower end thereof and as the trough 11 projects beyond the end of the frame 1 this trash may be removed from the trough 11 by hand. The nuts will roll down the screen 14 and out of the trough through the opening 15 ready for fanning or washing.

Having described the invention what I claim as new and desire to secure by Letters Patent is:—

A peanut whipper comprising a frame, parallel bars carried by the frame and having their upper edge portions beveled, and side and end inclosing screens mounted upon the frame, a closing top for the said screens, and flexible curtains closing one end of the side screens.

In testimony that I claim the foregoing as my own, I have hereto affixed my signature in the presence of two witnesses.

ALFRED W. POOLE.

Witnesses:
JOHN E. BRYAN,
T. C. MOORE.

---

Copies of this patent may be obtained for five cents each, by addressing the "Commissioner of Patents, Washington, D. C."